United States Patent [19]
Arnold et al.

[11] Patent Number: 5,856,795
[45] Date of Patent: Jan. 5, 1999

[54] KEYBOARD IDENTIFICATION

[75] Inventors: Kenneth W. Arnold; Harold S. Merkel, both of Houston, Tex.

[73] Assignee: Compaq Computer Corporation, Houston, Tex.

[21] Appl. No.: 935,034

[22] Filed: Sep. 22, 1997

Related U.S. Application Data

[63] Continuation of Ser. No. 609,291, Mar. 1, 1996, abandoned.

[51] Int. Cl.$^6$ .................................................. G05B 14/02
[52] U.S. Cl. ................. 341/26; 340/825.22; 340/825.23; 264/139
[58] Field of Search .................. 341/26; 340/825.23, 340/825.22; 264/189

[56] References Cited

U.S. PATENT DOCUMENTS 5,349,344  9/1994  Head ........................................ 341/26

*Primary Examiner*—Brian Zimmerman
*Assistant Examiner*—Albert K. Wong
*Attorney, Agent, or Firm*—Fish & Richardson P.C.

[57] ABSTRACT

A keyboard matrix of a keyboard has drive lines including a set of lines to be selectively activated for detection of depressed keys and scan lines including a set of lines to be selectively monitored for detection of depressed keys. The keyboard matrix includes circuitry for connecting one of the drive lines with one of the scan lines for providing an identification of the keyboard.

5 Claims, 4 Drawing Sheets

KEYBOARD IDENTIFICATION

This is a continuation of application Ser. No. 08/609,291, filed Mar. 1, 1996, now abandoned.

BACKGROUND

The invention relates to keyboard identification.

Keyboards of computer systems typically include a keyboard matrix which has scan and drive lines for detecting depressed keys. The drive and scan lines form a cross point switch matrix with the depression of each key closing a unique cross point switch and activating a unique pair of drive and scan lines. The computer system successively and individually activates the drive lines, and the scan lines are then monitored by the computer system to determine which scan line has been activated. In this manner, the coordinates of the depressed key can be determined, and the computer system then generates the appropriate scan code for the depressed key. The keyboard may be one of several types, such as Domestic or Japanese. Each type of keyboard has a unique set of key labels, and driver software of the computer system translates the scan code in view of the set of key labels associated with the keyboard.

SUMMARY

In general, in one aspect, the invention features a keyboard matrix of a keyboard having drive lines including a set of lines to be selectively activated for detection of depressed keys and scan lines including a set of lines to be selectively monitored for detection of depressed keys. The keyboard matrix includes circuitry for connecting one of the drive lines with one of the scan lines for providing an identification of the keyboard.

Implementation of the invention may include one or more of the following features. Only the scan lines other than the one of the scan lines providing the identification of the keyboard are monitored for the detection of depressed keys. The circuitry may be a hardwire connection. There may be multiple possible connections between the drive lines and the said scan lines. The identification may indicate a predefined set of key labels for the keyboard. The one of the drive lines may be selectively activated for detection of depressed keys. The one of the scan lines may be selectively monitored for detection of depressed keys.

In general, in another aspect, the invention features a computer system having a keyboard including a keyboard matrix with drive lines including a set of lines to be selectively activated for detection of depressed keys and scan lines including a set of lines to be selectively monitored for detection of depressed keys. The keyboard also has circuitry for connecting one of the drive lines with one of the scan lines for providing an identification of the keyboard. The computer system has a microcontroller for activating and monitoring the drive and scan lines and for receiving the identification of the keyboard.

In general, in another aspect, the invention features a computer system having a keyboard having an identity. The computer system also has an interrogation circuit for interrogating the identity of the keyboard and an identification circuit responsive to the interrogation circuit for furnishing the identity of the keyboard to the interrogation circuit.

Implementation of the invention may include one or more of the following features. The interrogation circuit may activate a drive line of the keyboard for interrogating the identity of the keyboard. The drive line may also be used for detection of depressed keys of the keyboard. The identification circuit may activate a scan line of the keyboard for furnishing the identity of the keyboard, and the scan line may also be used for detection of depressed keys of the keyboard.

In general, in another aspect, the invention features a method for identifying a keyboard of computer system. The method has the steps of interrogating the keyboard for an identity and providing the identity of the keyboard in response to the interrogation step.

Implementations of the invention may include one or more of the following features. The step of interrogating may include activating a drive line of the keyboard for interrogating the identity of the keyboard, and the computer system may also uses the drive line to detect depressed keys of the keyboard. The step of providing may include activating a scan line of the keyboard for furnishing the identity the identity of the keyboard, and the computer system may also use the scan line to detect depressed keys of the keyboard.

In general, in another aspect, the invention features a keyboard matrix of a keyboard having drive lines including a set of lines to be selectively activated for detection of depressed keys and scan lines including a set of lines to be selectively monitored for detection of depressed keys. The keyboard matrix has circuitry for connecting one of the drive lines with one of the scan lines for providing an identification of the keyboard, and the one of the drive lines is selectively activated for the detection of depressed keys.

In general, in another aspect, the invention features a keyboard matrix of a keyboard having drive lines including a set of lines to be selectively activated for detection of depressed keys and scan lines including a set of lines to be selectively monitored for detection of depressed keys. The keyboard matrix has circuitry for connecting one of the drive lines with one of the scan lines for providing an identification of the keyboard, and the one of the scan lines is selectively monitored for the detection of depressed keys.

In general, in another aspect, the invention features a computer system with a keyboard having a keyboard matrix with drive lines including a set of lines to be selectively activated for detection of depressed keys and scan lines including a set of lines to be selectively monitored for detection of depressed keys. The keyboard has circuitry for connecting one of the drive lines with one of the scan lines for providing an identification of the keyboard. The one of the drive lines is selectively activated for detection of depressed keys. The computer system has a microcontroller for activating and monitoring the drive and scan lines and for receiving the identification of the keyboard.

In general, in another aspect, the invention features a computer system with a keyboard having a keyboard matrix with drive lines including a set of lines to be selectively activated for detection of depressed keys and scan lines including a set of lines to be selectively monitored for detection of depressed keys. The keyboard has circuitry for connecting one of the drive lines with one of the scan lines for providing an identification of the keyboard. The one of the scan lines is selectively monitored for detection of depressed keys. The computer system has a microcontroller for activating and monitoring the drive and scan lines and for receiving the identification of the keyboard.

Among the advantages of the invention are one or more of the following. The identity of the keyboard is determined automatically. Only a single hardwired connection is required in the keyboard. Only one additional pin in the keyboard plug and connector is required.

Other advantages and features will become apparent from the following description and from the claims.

DESCRIPTION

Figure 1:
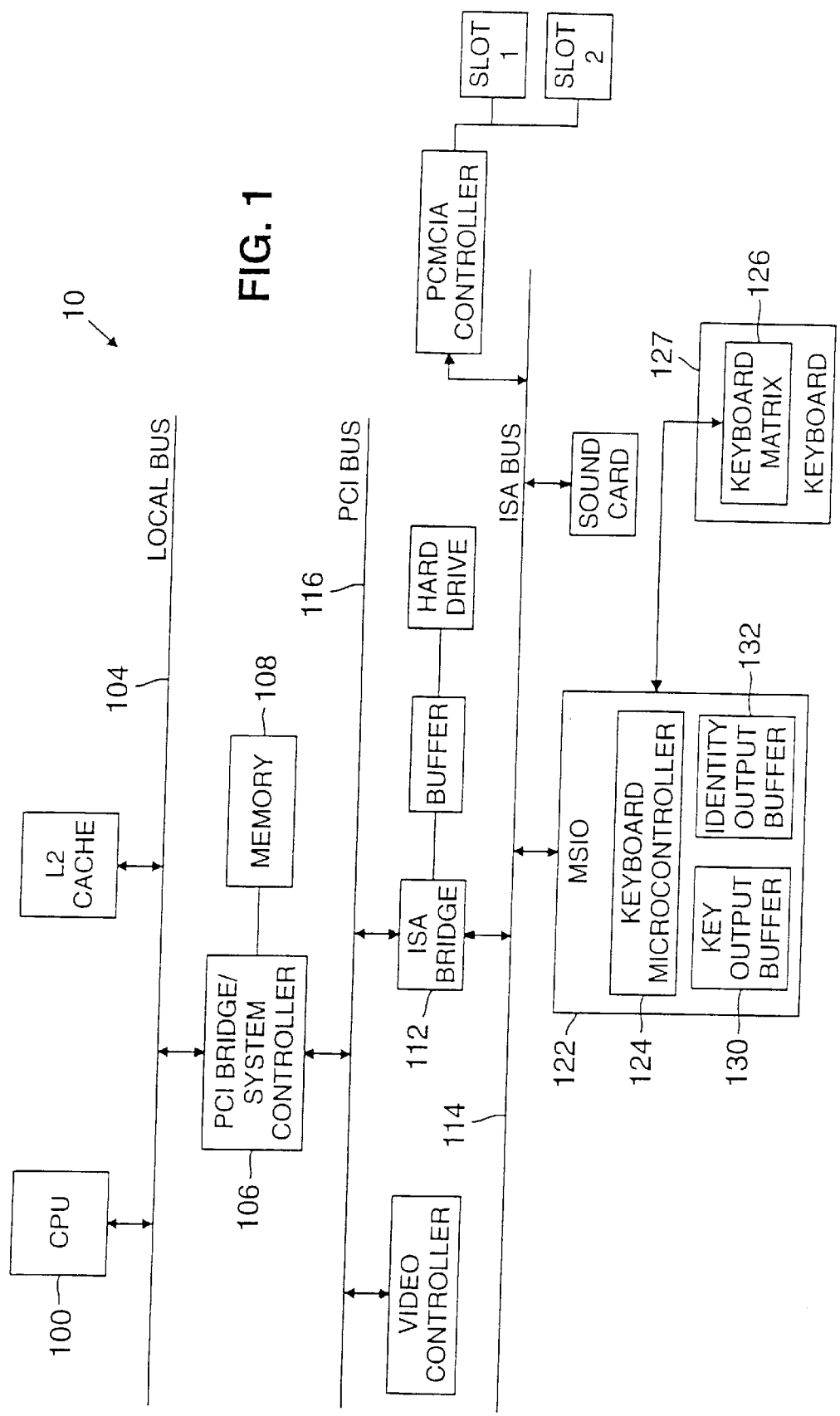
FIG. 1 is a block diagram of a computer system.
Figure 2:
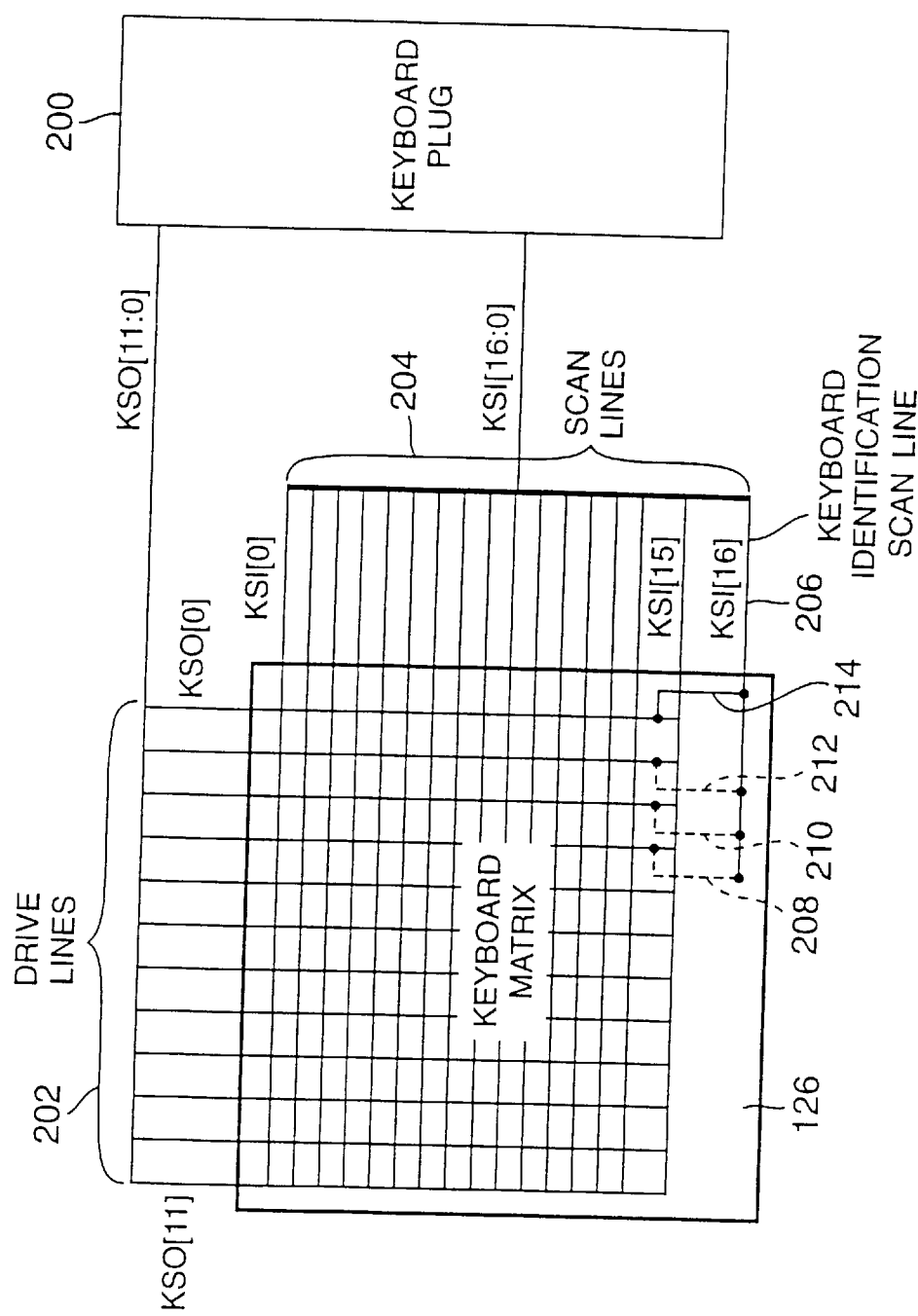
FIG. 2 is a schematic diagram of the keyboard matrix of FIG. 1.

As shown in FIGS. 1 and 2, a portable computer system 10 includes a keyboard 127. In order to provide identification of the keyboard 127, a keyboard matrix 126 of the keyboard 127 includes a keyboard identification scan line 206 that is activated only when a predetermined one of twelve drive lines 202 of the keyboard matrix 126 is activated. In a given keyboard, the keyboard identification scan line 206 is electrically coupled to only one of four possible identification drive lines 208–214, a subset of the drive lines 202. The particular drive line to which the scan line 206 is connected (e.g., drive line 214 in FIG. 2) identifies the keyboard 127 as being either a Domestic, a Brazilian, an International or a Japanese keyboard.

The keyboard matrix 126 includes seventeen scan lines 204. The signals present on the scan lines 204 are represented by KSI[16:0], and the signals present on the drive lines 202 are represented by KSO[11:0]. The signal present on the identification scan line 206 is represented by KSI[16]. The activation of one of the drive lines 202 or scan lines 204 equates to the negation, or driving low, of the corresponding signal. The deactivation of one of the drive lines 202 or scan lines 204 equates to a logic one level for the corresponding signal.

As is typically done in the course of reading keyboard data, the drive 202 and scan 204 lines of the keyboard matrix 126 are activated and monitored by, e.g., a Mobile Super Input/Output (MSIO) circuit 122 made by SMC. The MSIO circuit 122 includes a keyboard microcontroller 124 comparable to an 8051 microcontroller made by Intel.

The microcontroller 124 asserts successively and individually each of the drive line signals KSO[11:0]. By monitoring the scan line signals KSI[16:0] for assertion when one of the drive line signals KSO[11:0] is asserted, the microcontroller 124 can identify a depressed key of the keyboard 127 and store the code of the depressed key in a key output buffer 130 of the MSIO circuit 122.

The MSIO circuit 122 generates a hardware interrupt to a central processing unit (CPU) 100 when new keyboard data is received by the MSIO circuit 122 from the keyboard 127. The CPU 100 reads the new keyboard data from the key output buffer 130 of the MSIO circuit 122.

Besides the typical operations performed by the microcontroller 124, the microcontroller 124 also determines the identity of the keyboard 127 and stores the keyboard identity in an identity output buffer 132 of the MSIO circuit 122 which can be read by the CPU 100. In one circumstance, the MSIO circuit 122 generates a hardware interrupt when a new keyboard 127 is inserted into the portable computer system 10, and the CPU 100 reads the keyboard identity from the MSIO circuit 122. In another circumstance, the MSIO circuit 122 determines the identity of the keyboard 127 on power up. In another circumstance, the MSIO circuit 122 determines the identity of the keyboard 127 when the MSIO circuit 122 receives a request from the CPU 100.

The MSIO circuit 122 is coupled to an Industry Standard Architecture (ISA) bus 114. The ISA bus 114 is coupled to an ISA bridge 112 which provides communication between a Peripheral Component Interconnect (PCI) bus 116 and the ISA bus 114.

Connected to the PCI bus 116 is a PCI bridge/system controller circuit 106. The circuit 106 allows the PCI bus 116 to communicate to a local processor bus 104 of the CPU 100. The circuit 106 also controls access to a system memory 108. Other elements of the computer system 10 are in FIG. 1 but are not described here.

The keyboard identification scan line 206 is connected to either drive line 208, 210, 212 or 214, depending on whether the keyboard 127 is Brazilian, Japanese, International or Domestic, respectively. The keyboard drive line signals KSO[11:0] and the keyboard scan line signals KSI[16:0] are provided to a keyboard plug 200.

Figure 3:
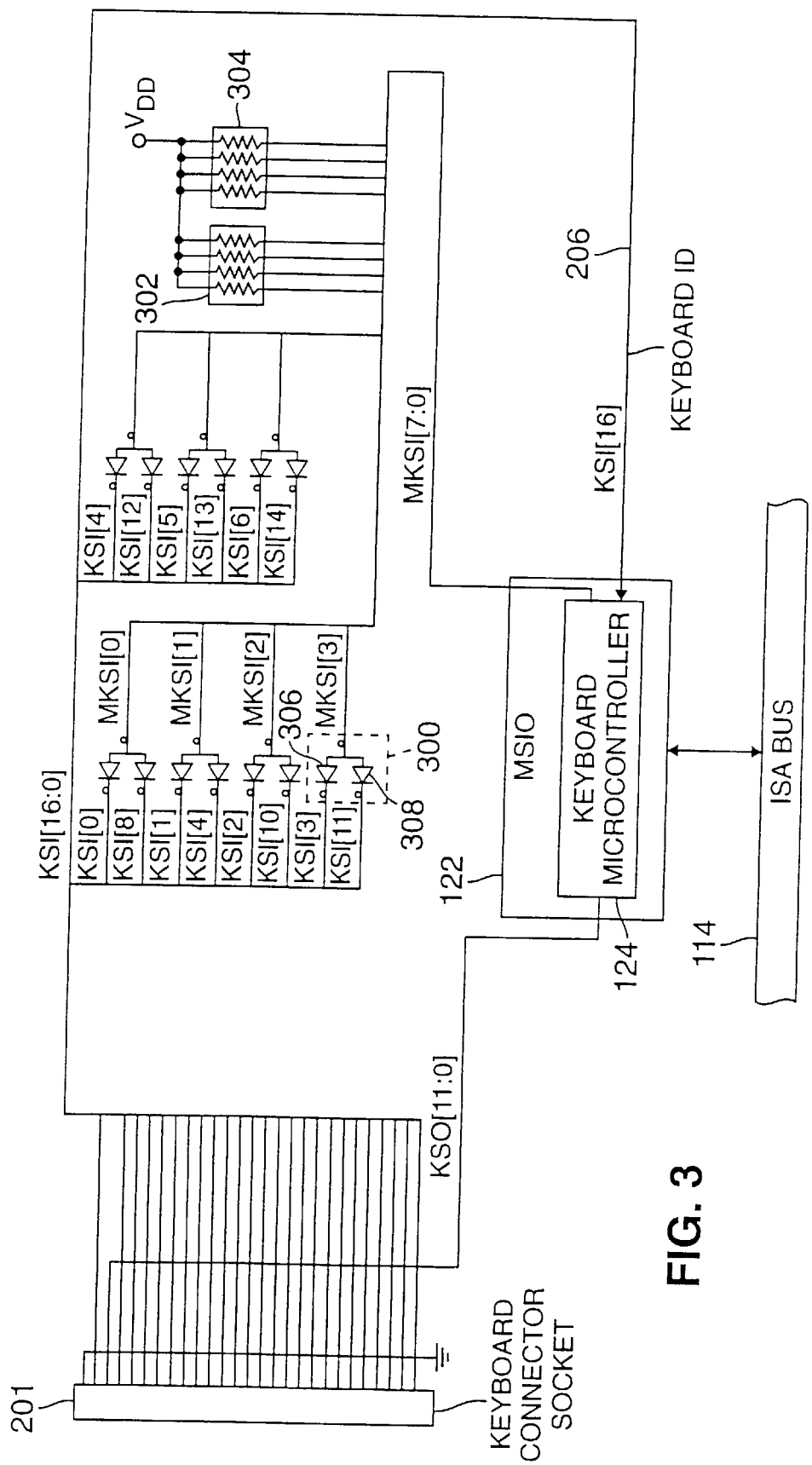
FIG. 3 is a schematic diagram of keyboard interface circuitry.

As shown in FIG. 3, a keyboard connector socket 201, adapted to mate with the keyboard plug 200, is electrically coupled to the keyboard drive line signals KSO[11:0] and the keyboard scan line signals KSI[16:0] when the keyboard plug 200 is connected to the keyboard connector socket 201. The keyboard identification scan line signal KSI[16] is furnished from the keyboard connector socket 201 to the microcontroller 124.

In the typical course of reading keyboard data, the keyboard microcontroller 124 monitors eight multiplexed scan line signals MKSI[7:0] of the scan line signals KSI[16:0]. Eleven drive line signals KSO[10:0] are selectively activated and eight scan line signals KSI[7:0] are monitored to scan character keys of the keyboard 127. Seven scan line signals KSI[14:8] are monitored when the drive line signal KSO[11] is activated to detect functional keys such as Shift, Alt and Ctrl.

Conventional diode circuits 300 multiplex seven of the scan line signals KSI[16:0] to seven of the multiplexed scan line signals MKSI[6:0] at the appropriate time. The scan line signal MKSI[7] is equivalent to the scan line signal KSI[7].

When one of the drive line signals KSO[10:0] is activated, the diode circuits 300 allow the microcontroller 124 to monitor the seven least significant scan line signals KSI[6:0] through the multiplexed scan line signals MKSI[6:0]. Each of the diode circuits 300 includes one diode 306 with its anode connected to one of the multiplexed scan line signals MKSI[7:0] and its cathode connected to the corresponding scan line signal KSI[7:0] in the same bit position.

Each of the diode circuits 300 also includes a diode 308 for monitoring the multiplexed scan line signals MKSI[14:8] when the drive line signal KSO[11] is activated. The diode 308 has its anode connected to the anode of the diode 306, and the cathode of the diode 310 is connected to the signal of the scan line signals KSI[14:8] having the same bit position as the multiplexed scan line signal MSKI[7:0] to which the cathode of the diode 308 is connected.

Pullup resistor networks 302 and 304 set the logic level of the multiplexed scan line signals MKSI[7:0] equal to logic one, or high, when the multiplexed scan line signals MKSI[7:0] are deactivated.

Figure 4:
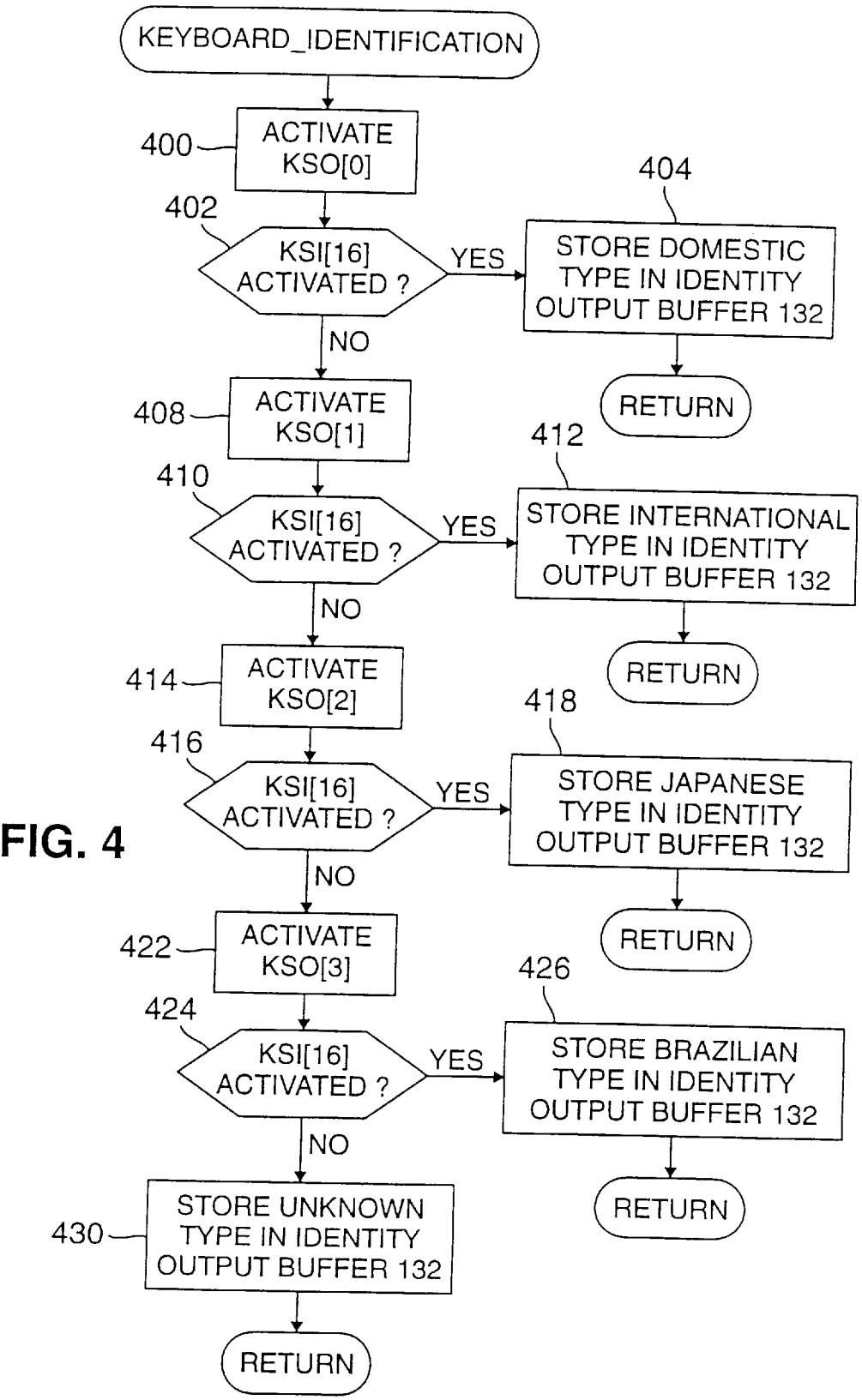
FIG. 4 is a flow diagram illustrating a keyboard identification routine.

As shown in FIG. 4, to determine the identification of the keyboard 127, the microcontroller 124 enters a keyboard identification routine. The keyboard identification routine may be called by the CPU 100 upon a user request, called to service an interrupt when a new keyboard 127 is inserted into the keyboard plug 200 or periodically called by the CPU 100.

The microcontroller activates 400 the keyboard drive line signal KSO[0]. The microcontroller 124 then determines 402 whether the keyboard scan line signal KSI[16] has been activated. If so, then the microcontroller 124 stores 404 the Domestic identity in the identity output buffer 132 and terminates the keyboard identification routine.

If the keyboard identification scan signal KSI[16] was deactivated 402, then the microcontroller 124 activates 408 the KSO[1] signal to check for the International keyboard type. The microcontroller 124 then determines 410 whether the keyboard scan line signal KSI[16] has been activated. If so, then the microcontroller 124 stores 412 the International identity in the identity output buffer 132 and terminates the keyboard identification routine.

If the keyboard identification scan line signal KSI[16] is deactivated 410, then the microcontroller 124 activates 414 the drive line signal KSO[2] to check for the Japanese keyboard type. The microcontroller 124 then determines 416 whether the keyboard identification scan line signal KSI[16] has been activated. If so, the microcontroller 124 stores 418 the Japanese identity in the identity output buffer 132 and terminates the keyboard identification routine.

If the keyboard identification line signal KSI[16] has not been activated 416, then the microcontroller 124 activates 422 the keyboard drive line signal KSO[3] to check for the Brazilian keyboard type. The microcontroller 124 then determines 424 whether the keyboard scan line identification signal KSI[16] has been activated. If so, the microcontroller 124 stores 426 the Brazilian identity in the identity output buffer 132 and terminates the keyboard identification routine.

If the keyboard identification scan line signal KSI[16] is deactivated 424, then the keyboard 127 is an unknown type. On this occurrence, the microcontroller 124 stores 430 the unknown identity in the identity output buffer 132 and terminates the keyboard identification routine.

Other embodiments are within the scope of the following claims.

What is claimed is:

1. A method for use with two computer keyboards of a common type, each of the keyboards having a matrix of drive lines and scan lines, the two keyboards having respectively different sets of character labels for the keys, the method comprising:

in each of the keyboards, selectively activating the drive lines;

in each of the keyboards, selectively monitoring a selected subset of the scan lines;

for each of the keyboards, determining it the selected subset of the scan lines has been activated;

in response to the step of determining, identifying the sets of character labels of the keyboards; and treating key signals from each of the keyboards in accordance with the labels of the keyboard.

2. The method of claim 1 wherein the treating includes using the scan lines of the keyboards to detect depressed keys.

3. The method of claim 1, wherein the treating includes using the drive lines of the keyboards to detect depressed keys.

4. The method of claim 1, wherein the sets of character labels comprise two sets selected from a group consisting of a set of Domestic character labels, a set of Brazilian character labels, a set of International character labels and a set of Japanese character labels.

5. The method of claim 1 wherein the selected subset of scan lines comprises exactly one scan line.

* * * * *